(No Model.) 2 Sheets—Sheet 1.
T. T. PROSSER & C. H. WILDER.
APPARATUS FOR MANUFACTURING GAS.
No. 461,982. Patented Oct. 27, 1891.
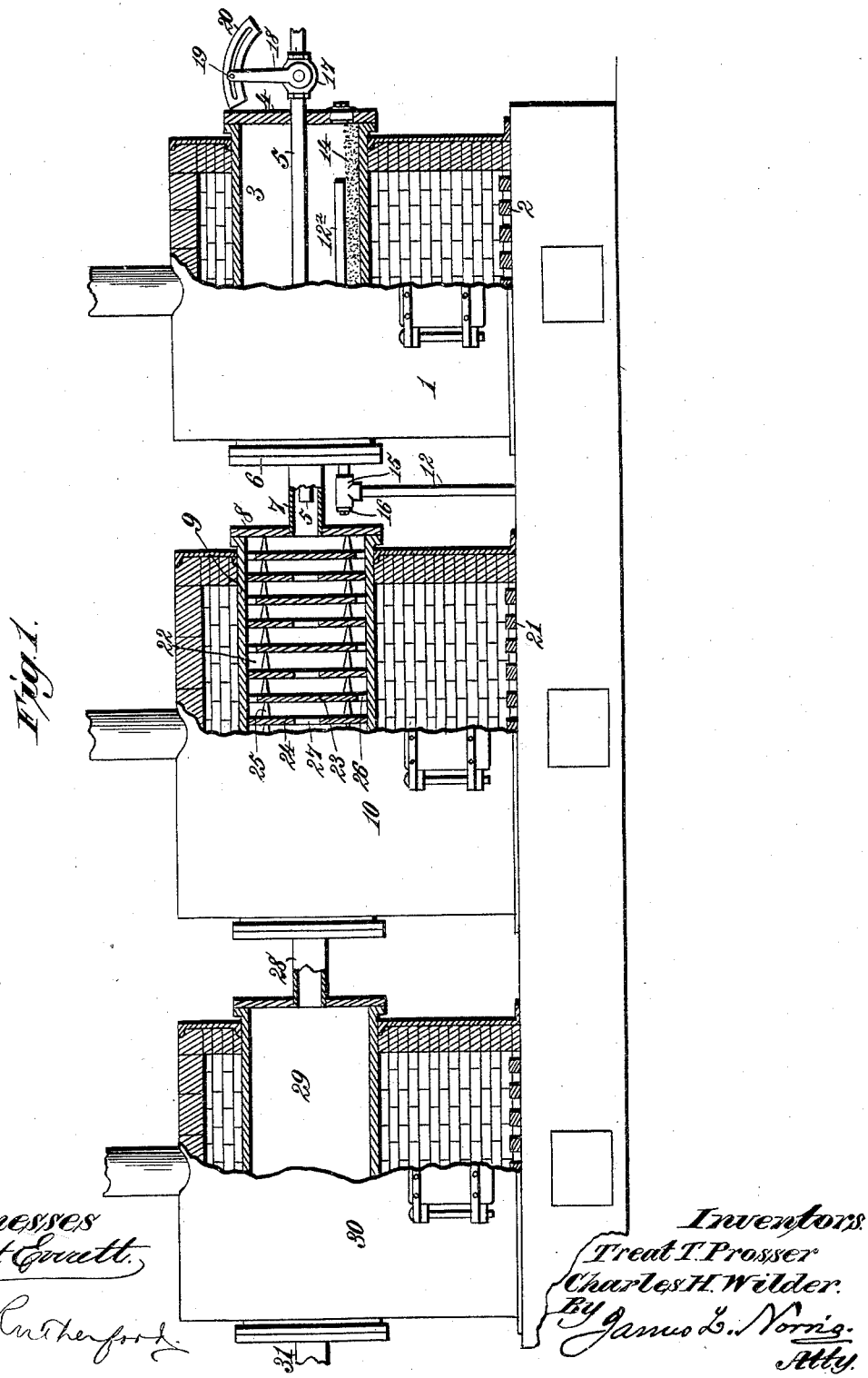
Witnesses
Robt Everett
J. A. Rutherford
Inventors
Treat T. Prosser
Charles H. Wilder
By James L. Norris
Atty.

(No Model.) 2 Sheets—Sheet 2.
T. T. PROSSER & C. H. WILDER.
APPARATUS FOR MANUFACTURING GAS.
No. 461,982. Patented Oct. 27, 1891.
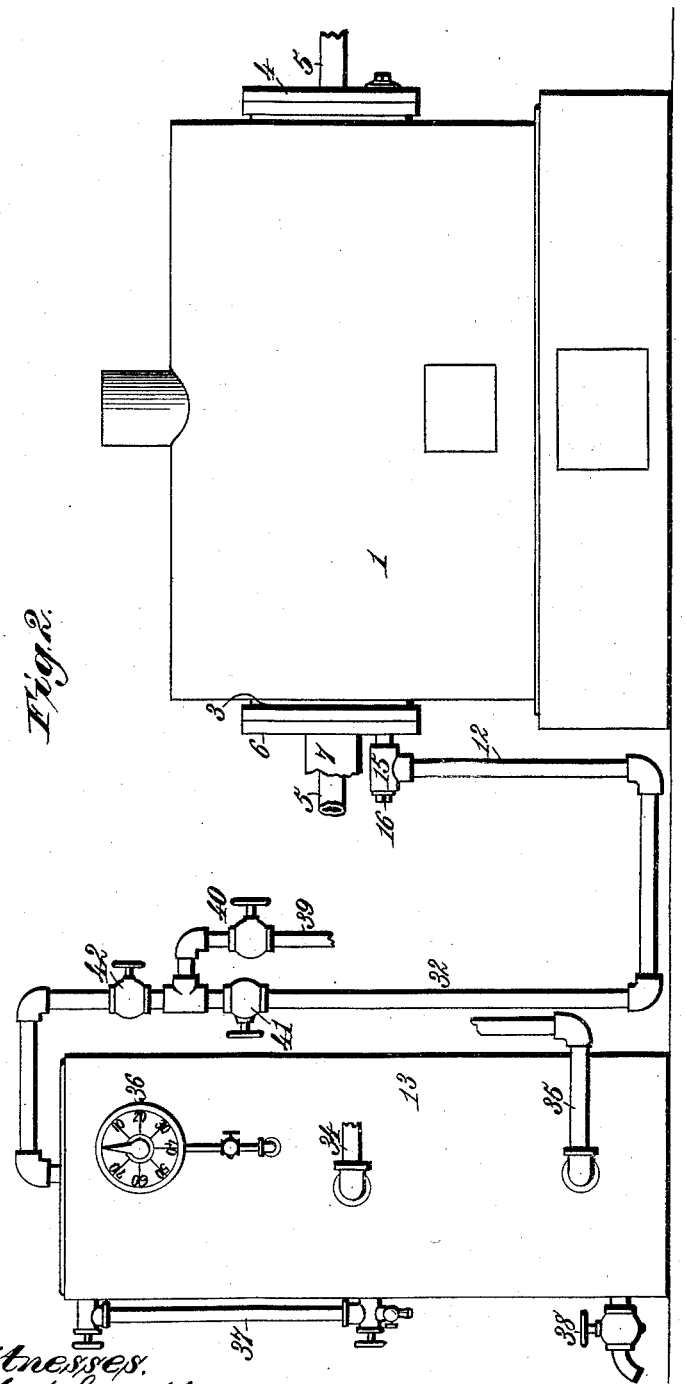
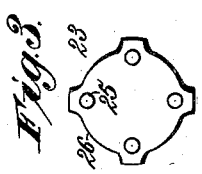
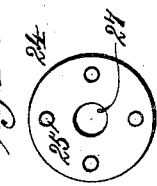
Witnesses.
Robert Everett.
J. A. Rutherford
Inventors.
Treat T. Prosser.
Charles H. Wilder.
By James L. Norris.
Atty.

UNITED STATES PATENT OFFICE.

TREAT T. PROSSER AND CHARLES H. WILDER, OF BOSTON, MASSACHUSETTS, ASSIGNORS TO CHARLES H. WILDER, OF SAME PLACE, AND LUKE A. WILDER, OF CHICAGO, ILLINOIS.

APPARATUS FOR MANUFACTURING GAS.

SPECIFICATION forming part of Letters Patent No. 461,982, dated October 27, 1891.

Application filed November 10, 1890. Serial No. 370,997. (No model.)

*To all whom it may concern:*

Be it known that we, TREAT T. PROSSER and CHARLES H. WILDER, citizens of the United States, residing at Boston, in the county of Suffolk and State of Massachusetts, have invented certain new and useful Improvements in Apparatus for Manufacturing Gas, of which the following, taken in connection with the accompanying drawings, is a specification.

This invention has for its object to provide an improved apparatus for the manufacture of gas from hydrocarbon-oils, whereby such gas is diluted with atmospheric air and the intermingled oil vapor and air are formed into a fixed gas.

The invention also has for its object to provide a novel apparatus for economically manufacturing gas from Lima oil, whereby such oil is capable of being practically utilized in the manufacture of gas, which heretofore has not been practical, owing to the difficulty of volatilizing the oil and fixing the gas.

To accomplish these objects our invention involves the features of construction, the combination or arrangement of devices, and the principles of operation hereinafter described and claimed, reference being made to the accompanying drawings, in which—

Figure 1 is a sectional side elevation of an apparatus constructed in accordance with our invention. Fig. 2 is a side elevation of the oil reservoir or tank, showing also the water-pipe for filling, feeding, and regulating the pressure on the oil. Figs. 3 and 4 are detail views of the diaphragms for dividing the mixing-retort into transverse chambers.

In the said drawings, the reference-numeral 1 designates a furnace, having a grate 2 and provided with a horizontal retort 3, the ends of which project from the end walls of the furnace. Through the end 4 of said retort enters an air-pipe 5. The other end 6 of said retort is provided with a pipe 7 of larger diameter than the air-pipe 5, and this pipe 7 communicates with the end 8 of a second air and vapor mixing retort 9, arranged in a second furnace 10, the air-pipe 5 having its open end terminated in the pipe 7. The construction of this air and vapor mixing retort will be explained hereinafter.

Through the end 6 of the retort 3 enters a feed-pipe 12, which carries the oil from its reservoir 13. This feed-pipe is provided with a horizontal branch $12^a$, which terminates within the retort, its open end lying, preferably, somewhat nearer the end 4 than the opposite end 6, the bottom of said retort being provided with a lining of plumbago 14 to receive the oil. In the pipe 12, at the coupling 15, is placed a plug 16 to enable the oil-pipe $12^a$ to be cleansed. In the air-pipe 5, outside the retort 3, is located a cock 17 for regulating the volume of air, said cock having a lever 18, which is provided with a pin or point 19, moving over a segmental scale 20, by which the volume of air admitted may be graduated.

The air and vapor mixing retort 9, which is connected with the first by the pipe 7, is heated by a furnace structure having a grate 10, similar in all essential respects to the furnace structure 1. This second retort, while it is of the same general form as the retort 3, is usually made somewhat longer and is divided interiorly into a series of chambers 22 by transverse diaphragms or partitions 23 and 24. Each of these diaphragms is provided with nipples or similar projections 25, whereby they are retained at a suitable distance one from another to form the chambers 22. The diaphragms 23, which alternate with the diaphragms 24, are cut away upon their edges to form peripheral openings 26, as shown in Fig. 3, while each of the diaphragms 24 is provided with a central opening 27. In this manner it will readily be seen that the vapors of the oil and the air passing to the retort 9 will be compelled to pass through the openings 26, and thence through the central openings 27 alternately, thereby effecting a complete and thorough admixture of the air and vapor, thus forming a fixed gas. From the second retort 9 this gas passes by way of a pipe 28 into a third or gas-reheating retort 29, consisting of an expanded chamber heated by any suitable form of furnace 30. In this third retort the fixed gas is submitted to a further temperature, whereby any substances not fully volatilized are thrown down prior to their entrance into the gas-holder. This third retort is connected with the gas-holder by a pipe 31.

The oil-feeding pipe 12 is connected by a branch 32 with the top of the oil reservoir or tank 13, heretofore mentioned, said tank being provided with an oil-supply pipe 34 for filling the tank and with a pipe 35, having a vertical branch by which the necessary hydrostatic column is supplied for the feed-pressure, said pressure being indicated by a gage 36, while the quantity of oil in the reservoir is shown by a gage-tube 37. A cock 38 is attached at the bottom of the tank to permit the withdrawal of the water. The branch 32 of the oil-feeding pipe has an auxiliary branch 39, provided with a cock 40, through which the oil may flow, when testing the quality, by running it into an empty measure. In the branch pipe 32 is placed a cock 41 below the point of union of the auxiliary branch 39 and a second cock 42 above said point. When the cock 42 is properly adjusted, the lower cock 41 is opened and the cock 40 in the auxiliary branch is closed. When it is necessary to close the feed, the cock 41 is closed and the cock 42 left open ready for operation whenever the cock 41 shall be again opened. In this manner the cock 42 is only used for adjusting the feed of the oil. Both the oil-supply and water-supply pipes 34 and 45 are provided with cocks for closing them, said cocks not being shown in the drawings.

By supplying the oil to the tank 13 and floating it upon the water therein any foreign substances it may contain having a greater specific gravity than the water will be thrown down therein and drawn off through the waste-cock 38, thus preventing the filling of the pipes. By feeding the oil from the upper portion of the oil-reservoir 13 the lighter and most volatile portion is constantly being removed, and thus all danger of explosion from that source is avoided. By taking the oil into the retort at one end and extending the feed-pipe nearly through the retort the oil is nearly volatilized before it leaves the pipe, and by coating the bottom of the retort with plumbago fixed carbon is prevented from forming and accumulating on the inside of the retort. Moreover, by passing the air-pipe entirely through the first retort, by which the oil is volatilized, the air and vapor become heated to about the same temperatures, and by mingling said air with the vapor from the oil in transit to the second retort the expansion due to their different capacities for the absorption of heat is fully provided for. Finally, by the provision of the third retort, where an additional time can be used and a further heat imparted, all dead-oil or foreign substances are thrown down prior to the entrance of the gas within the gas container or holder.

What we claim as new, and desire to secure by Letters Patent, is—

1. An apparatus for the manufacture of gas, consisting of a furnace structure containing a vaporizing-retort, a furnace structure containing an air and vapor mixing retort, a tube connection between the adjacent ends of the said retorts, an oil-supply pipe extending into the vaporizing-retort and delivering the oil in a heated condition thereinto, and an air-supply pipe extending through the vaporizing-retort and terminating in the tube connection between the two retorts for delivering heated air into the vaporized oil in transit through the tube connection for delivering the admixture of air and oil vapor into the mixing-retort, substantially as described.

2. An apparatus for the manufacture of gas, consisting of a vaporizing-retort, an air and vapor mixing retort, a tube connection between the adjacent ends of the said retorts, an oil-supply pipe extending into the vaporizing-retort for delivering the oil in a heated condition thereinto, an oil-tank, with the top of which the oil-supply pipe connects, a water-pipe entering the lower end of the oil-tank and delivering water therein to force oil by hydrostatic pressure through the oil-supply pipe, and an air-supply pipe extending through the vaporizing-retort and terminating in the tube connection between the two retorts for delivering heated air into the vaporized oil in transit through the tube connection to the mixing-retort, substantially as described.

3. An apparatus for the manufacture of gas, consisting of a vaporizing-retort having its bottom wall coated or lined with plumbago, an air and vapor-mixing retort having a tube connection with one end of the vaporizing-retort, an oil-supply pipe extending into the vaporizing-retort and arranged to deliver the oil in a heated condition upon the coating or lining of plumbago, and an air-supply pipe arranged to deliver heated air to the oil-vapor in transit to the air and vapor-mixing retort, substantially as described.

4. An apparatus for the manufacture of gas, consisting of a furnace structure containing a vaporizing-retort, a furnace structure containing an air and oil-vapor mixing retort provided interiorly with a series of separated diaphragms formed with alternating orifices for the tortuous circuit of the air and vapor, a tube connection between the adjacent ends of the said retorts, an oil-supply pipe entering the vaporizing-retort and arranged to deliver the oil in a heated condition thereinto, and an air-supply pipe located within the vaporizing-retort and arranged to deliver the heated air into the oil-vapor in transit to the air and vapor mixing retort, substantially as described.

5. An apparatus for the manufacture of gas, consisting of a furnace structure containing a vaporizing-retort, a furnace structure containing an air and vapor mixing retort, a tube connection between the adjacent ends of the said retorts, a series of separated diaphragms arranged within the air and vapor mixing retorts and provided alternately with orifices for the tortuous circuit of the oil and vapor, an oil-supply pipe extending into the vaporizing-retort and arranged to deliver the oil in a heated condition thereinto, and an air-supply pipe extending through the vaporizing-retort and terminating within the tube connection between the retorts and arranged to deliver heated air to the oil-vapor in transit through the tube connection, substantially as described.

6. An apparatus for the manufacture of gas, consisting of a furnace structure containing a vaporizing-retort, a furnace structure containing an air and vapor mixing retort having a tube connection with one end of the vaporizing-retort, a furnace structure containing a gas-reheating retort having a tube connection with the air and vapor mixing retort at the end thereof opposite that which connects with the vaporizing-retort, an oil-supply pipe extending into the vaporizing-retort and arranged to deliver the oil in a heated condition thereinto, and an air-supply pipe extending through the vaporizing-retort and arranged to deliver the heated air to the oil-vapor in transit to the air and vapor mixing retort, substantially as described.

In testimony whereof we have signed our names to this specification, in the presence of two subscribing witnesses, on this 1st day of October, A. D. 1890.

TREAT T. PROSSER.
CHARLES H. WILDER.

Witnesses:
JOHN ROWE, Jr.,
LUKE A. WILDER.